US009900320B2

(12) United States Patent
Dietze et al.

(10) Patent No.: US 9,900,320 B2
(45) Date of Patent: Feb. 20, 2018

(54) MOBILE STATION COMPRISING SECURITY RESOURCES WITH DIFFERENT SECURITY LEVELS (71) Applicant: GIESECKE & DEVRIENT GMBH, Munich (DE)

(72) Inventors: Claus Dietze, Obersochering (DE); Gero Galka, Valley (DE)

(73) Assignee: GIESECKE + DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 14/784,099

(22) PCT Filed: Apr. 14, 2014

(86) PCT No.: PCT/EP2014/000996
§ 371 (c)(1),
(2) Date: Oct. 13, 2015

(87) PCT Pub. No.: WO2014/170006
PCT Pub. Date: Oct. 23, 2014

(65) Prior Publication Data
US 2016/0072825 A1    Mar. 10, 2016

(30) Foreign Application Priority Data
Apr. 15, 2013  (DE) .................. 10 2013 006 470

(51) Int. Cl.
*G06F 21/57*  (2013.01)
*H04L 29/06*  (2006.01)
(Continued)

(52) U.S. Cl.
CPC ............ *H04L 63/105* (2013.01); *G06F 21/57* (2013.01); *G06F 21/577* (2013.01);
(Continued)

(58) Field of Classification Search
CPC .................. G06F 21/57; G06F 21/577; G06F 2221/2113; H04L 63/105; H04W 12/10
See application file for complete search history.

(56) References Cited

U.S. PATENT DOCUMENTS 6,944,478 B1 *  9/2005  Durand .................. H04L 29/06
                                                            455/411
8,683,598 B1 *  3/2014  Cashin .................. G06F 21/577
                                                            713/188
(Continued)

FOREIGN PATENT DOCUMENTS

WO    2011131365 A1   10/2011

OTHER PUBLICATIONS

Machine translation of Chinese App. No. 201210218435 filed on Jun. 28, 2012.*

(Continued)

*Primary Examiner* — Thaddeus Plecha
(74) *Attorney, Agent, or Firm* — Justin Cassell; Workman Nydegger (57) ABSTRACT The invention provides a mobile station comprising a mobile end device, security resources, and a discovery module implemented in the mobile station, with which the security resources of the mobile station are discoverable, at least one security level of the mobile station that is achievable by means of the security resources is derivable, and derived security levels of the mobile station are outputable. Further, there are stated an application loading system having such a mobile station, and a risk assessment system for mobile stations.

14 Claims, 2 Drawing Sheets (51) Int. Cl.
  *H04W 12/10* (2009.01)
  *H04W 12/08* (2009.01)
  *H04W 88/02* (2009.01)

(52) U.S. Cl.
  CPC .......... *H04L 63/1433* (2013.01); *H04L 63/20* (2013.01); *H04W 12/08* (2013.01); *H04W 12/10* (2013.01); *G06F 2221/2105* (2013.01); *G06F 2221/2113* (2013.01); *H04W 88/02* (2013.01)

(56) References Cited

U.S. PATENT DOCUMENTS

| | | | | |
|---|---|---|---|---|
| 8,806,655 | B1* | 8/2014 | Brownell | H04L 63/10 726/27 |
| 2005/0268342 | A1* | 12/2005 | Shay | G06F 21/57 726/26 |
| 2007/0157310 | A1* | 7/2007 | Kondo | G06F 21/51 726/22 |
| 2007/0240205 | A1 | 10/2007 | Holtmanns et al. | |
| 2008/0194296 | A1 | 8/2008 | Roundtree | |
| 2009/0254993 | A1* | 10/2009 | Leone | G06F 21/51 726/25 |
| 2010/0306107 | A1 | 12/2010 | Nahari | |
| 2013/0035062 | A1 | 2/2013 | Vered | |
| 2013/0042300 | A1 | 2/2013 | Spitz | |
| 2013/0055411 | A1* | 2/2013 | Yang | H04W 12/08 726/30 |
| 2013/0185568 | A1* | 7/2013 | Wakao | G06F 21/35 713/185 |
| 2013/0268668 | A1* | 10/2013 | Abuelsaad | G06F 21/57 709/225 |
| 2013/0276124 | A1* | 10/2013 | Tahir | G06F 21/577 726/25 |
| 2015/0106945 | A1* | 4/2015 | Wang | H04L 63/1433 726/25 |

OTHER PUBLICATIONS

German Search Report for corresponding German Application No. 102013006470.8, dated Jan. 16, 2014.
International Search Report for corresponding International PCT Application No. PCT/EP2014/000996, dated Sep. 5, 2014.

* cited by examiner

Fig. 1

| Security resource SR | Security level SL |
|---|---|
| REE – Rich OS; optionally with cryptographic functions | L1 – minimal |
| Virtual Secure Element | L2 – low |
| TEE – Secure OS | L3 – medium |
| SIM card | L4 – enhanced |
| Embedded Secure Element (eSE) | L5 – elevated |
| Certified SIM card | L6 – high |
| Certified eSE | L7 – very high |

Fig. 2

| SR | ASL | Range of functions App | Application variant |
|---|---|---|---|
| REE | L1 | ---- | ---- |
| Virt. SE | L2 | ---- | ---- |
| TEE | L3 | Standard | Standard |
| SIM | L4 | Medium | Medium |
| eSE | L5 | Advanced | Advanced |
| zert SIM | L6 | Plus | Plus |
| zert eSE | L7 | Premium | Premium |

MOBILE STATION COMPRISING SECURITY RESOURCES WITH DIFFERENT SECURITY LEVELS

BACKGROUND

The invention concerns a mobile station comprising a mobile end device and comprising security resources, as well as an application loading system and a risk assessment system, respectively having a mobile station.

A mobile station comprises a mobile end device, and as a rule in addition a subscriber identity module (also called a Secure Element SE) which is operable in the end device and with which the end device is operable in a mobile radio network. The subscriber identity module or Secure Element SE is designed in many mobile radio systems as a removable subscriber card (microprocessor chip card), e.g. as a SIM card, alternatively as a hard-implemented eUICC (embedded UICC; UICC=Universal Integrated Circuit Card).

A mobile end device is understood to be a device for utilization of a mobile radio system, e.g. a mobile telephone, smart phone or PDA (personal digital assistant) having a mobile-telephone function.

There is known under the designation Trustzone (trademark of the company ARM) architecture a two-tier runtime architecture, comprising two runtime environments, for a microprocessor system. A first, insecure runtime environment called "Normal Zone" or "Normal World" is controlled by a normal operating system (e.g. Android, Windows Phone, iOS). A second, secure or trustworthy runtime environment called "Trustzone" or "Trusted World" or "Secure World" or "Trusted Execution Environment TEE" is controlled by a security operating system.

The subscriber identity module, the normal runtime environment and the secure runtime environment constitute security resources of the mobile station which offer different security levels. The normal runtime environment is comparatively insecure, i.e. has a low security level. A SIM card has a comparatively high security level, the secure runtime environment TEE a medium one.

Many users of applications for mobile stations demand that applications that they utilize in their mobile stations adhere to a certain security level. Otherwise they might not be willing to utilize the application in their mobile stations. Providers of applications for mobile stations are hence interested in being able to guarantee a defined security level for their applications. The security level of an application depends on the security resources of the mobile station, however. Only if the mobile station's security resources meet a certain minimum standard can the application guarantee a sufficient degree of security.

WO 2011/131365 A1 describes a system and a method for subsequently configuring an application already located in a mobile end device. A central server has information about possible security resources (end-device configurations with different runtime environments and/or security elements) of mobile end devices and about security levels corresponding to the security resources. In dependence on a security level of the end device which the central server has detected, the server selects a matching application configuration and configures the application already located in the end device so as to match the security level. Only one application variant needs to be held on the server. The subsequent configuration nevertheless produces an application configuration corresponding to the security level.

The system and method from WO 2011/131365 A1 assume that the security resources (end-device configuration) of an end device are known, or at least theoretically known, to the end device itself. Only then can the end device request the matching configuration from the server.

The security resources of a mobile station can change, however. For example, a secure runtime environment can be added or removed. Likewise, a SIM card can be removed. It is therefore not guaranteed that the security resources assumed e.g. according to the end device's model number correspond to the actual security resources.

SUMMARY

The invention is based on the object of providing a mobile station that is able to guarantee a defined security level. In particular, there is to be stated a mobile station with which a defined application security level can be guaranteed for applications implemented or to be implemented in the mobile station. Further, there is to be stated an application loading system for loading an application into a mobile station, wherein a defined application security level can be guaranteed for applications loaded into the mobile station.

The mobile station according to the invention, according to the independent claim 1, comprises a mobile end device and comprises security resources. The mobile station is characterized by a detection or discovery module implemented in the mobile station, with which the security resources of the mobile station are discoverable, at least one security level of the mobile station that is achievable by means of the security resources is derivable, and derived security levels of the mobile station are outputable.

The discovery module makes it possible to discover which security resources are actually present in the mobile station. In particular, the discovery module makes it possible to recognize when security resources have been removed from the mobile station or have been added to the mobile station. The security resources discovered by the discovery module therefore correspond to the actual current security state of the mobile station. On this basis an actual current security level of the mobile station is derivable by the discovery module, taking into account any security resources that might have been omitted or newly added. Since a security level derived and outputted by the discovery module is always current, a security level of the mobile station can be not only assumed, but actually guaranteed, with a mobile station containing the discovery module.

Hence, there is provided according to claim 1 a mobile station that is able to guarantee a defined security level.

Electively, there are provided as security resources one or a plurality of the following security modules: a normal runtime environment of the end device, in particular with or without cryptographic functions; a virtual subscriber identity module implemented in the end device; a secure runtime environment of the end device; a subscriber identity module operable in the end device, in particular removable subscriber identity module (e.g. SIM card or USIM card), hard-implemented subscriber identity module (e.g. eUICC), certified removable subscriber identity module, certified hard-implemented subscriber identity module; secure microprocessor memory card, in particular Secure SD card and/or Secure MicroSD card.

Electively, a security level of the mobile station is derivable and outputable by the discovery module for every security module and/or for every combination of one or a plurality of security modules of the mobile station. Electively, there are outputable a multiplicity of at least a plurality or all of the security levels of a plurality or all of the security resources/security modules of the mobile station.

Electively, there is outputable by the discovery module, together with the security level, that security resource or security module to which the security level applies.

Electively, there is outputable by the discovery module a listing of a plurality or all of the security resources/security modules together with the appurtenant security levels, e.g. as a table.

According to one embodiment of the mobile station, the discovery module is integrated into a programming interface, in particular into a so-called Application Programming Interface API, by means of which output information concerning security levels of the mobile station is outputable from the mobile station and/or control information for controlling security levels is inputtable to the mobile station.

As output information there is electively outputable at the programming interface one or a plurality of the following: a security level of the mobile station; an available security resource of the mobile station; a security level of a security resource; all security levels of all security resources of the mobile station; all available security resources of the mobile station; the highest available security level of the mobile station; a currently set security level of the mobile station; functionality information on functionalities available for a, or every, security level or for a, or every, security resource. In the programming interface the discovery module has to discover and output the functionality, security resources and security levels. Functionalities going beyond that, such as supplying functionality information, are carried out by other parts of the programming interface. As a set security level there is provided for example that security level that the mobile station must (electively at least or exactly) meet upon its operation. From the set security level it follows for example which security resource (e.g. SIM card, or TEE, etc.) the mobile station must employ upon its operation.

Functionalities of the mobile station are subject—as a rule—to the principle that the more functionalities of the mobile station are available, the higher the security level is. The lower the security level of the mobile station is, the fewer functionalities of the mobile station are available (i.e. employable, e.g. activated). For example, a functionality of the mobile station with which cryptographic computations can be carried out is deactivated if the discovered security level is too low. When there is added to the mobile station a new security resource through which the security level of the mobile station is increased, the new security level is discovered and the functionality with which cryptographic computations can be carried out is released or activated, i.e. subsequently employable.

In the case of the derived and outputted security levels being application security levels, the functionality information in particular electively also relates to an application. As functionality information relating to an application there is for example provided information about which application functionalities are available at a derived application security level or, in general, which application functionality is available at which derived application security level. A set application security level can be realized for example by an application having to be loaded into a security resource corresponding to the set application security level. Electively, a minimum application security level can be set, so that an application has to be loaded into a security resource that meets at least the minimum application security level.

Electively, the control information involves one or a plurality of the following: specifying the utilization of a certain security resource with a certain security level; specifying the utilization of that security resource that has the highest security level. In the case of the security level provided being an application security level, specifying the utilization of a certain security resource with a certain security level is realized for example by an application to be implemented and/or to be executed being implemented and/or executed in the security resource with the certain security level. Specifying the utilization of the security resource with the highest application security level means for example that the application is implemented or executed in the security resource with the highest security level.

Electively, the discovery module is implemented in that security resource of the mobile station that yields or gives to the mobile station the highest security level. This ensures that the discovery module is protected from tampering. Tampering could aim for example at simulating security resources that are not present, falsely deriving therefrom an incorrectly high security level, and activating an impermissibly high range of functions of the mobile station or of an application implemented thereon.

Electively, the discovery module is implemented in a security resource of the mobile station that is hard-implemented in the end device, in order to prevent the discovery module DIS from being removed from the mobile station.

If the mobile station has a removable SIM card, the stipulation of providing the discovery module in a hard-implemented security resource can collide with the likewise desirable stipulation that the discovery module is implemented in the security resource that yields the highest security level. According to one option, the discovery module is provided in that hard-implemented security resource that has the highest security level, e.g. in a hard-implemented subscriber identity module (e.g. eUICC), alternatively in a secure runtime environment. In the case of the secure runtime environment, compromises in terms of security are accepted in favor of the discovery module being fixed in place. According to another option, the discovery module is provided in a removable subscriber identity module (e.g. SIM card). Here, compromises in terms of preventing removal of the discovery module are made in favor of security.

Electively, the mobile station further contains application information about at least one application implemented or implementable in the mobile station. Here, there is derivable with the discovery module, as a security level of the mobile station, an application security level that is achievable while employing the security resources upon an operation of the application in the mobile station. In this embodiment, there is therefore derivable and outputable a security level that is achieved when the application is executed on the mobile station. What is discovered is thus a security level at the application level. Additionally or alternatively, there can be derivable and outputable a security level at the device level, which exists independently of the execution of an application on the mobile station. Of particular practical importance, however, is a security level at the application level, with which it can be assessed how secure a mobile station is in connection with an application running on the mobile station.

Electively, the mobile station further has an application control module coupled or coupleable with the discovery module, through which, in dependence on the application security level derived for an application, the execution of the application is controllable in a range of functions corresponding to the application security level. Controlling the execution of the application electively comprises that the application is executed immediately in the fixed range of functions. Alternatively, controlling the execution comprises that the application is activated in the fixed range of functions, i.e. is set to be functional, to be executed in the fixed range of functions, without the application being immediately executed.

Electively, there is provided as the execution of the application in a range of functions corresponding to the security level one of the following, in an order with a decreasing range of functions: execution of the application in an extended range of functions; execution of the application in the full range of functions; execution of the application in a restricted range of functions; non-execution of the application. An extended range of functions can be extended relative to the full range of functions in particular by those additional functionalities or additional services that deviate from a core functionality of the application.

A mobile station having a discovery module with which a security level at the application level is derivable and outputable is operated for example as follows.

The mobile station has an application implemented therein. The application is not being executed at the moment and is to be caused to be executed. With the discovery module there are discovered the mobile station's security resources that are currently present and in operation, e.g. normal and or secure runtime environment, SIM card, eUICC, Secure (Micro) SD card, etc. The discovery module is supplied with information as to which application is to be operated in the mobile station. Whether the security resources are first discovered or the information about the application is first supplied to the discovery module is of no matter as a rule. On the basis of the discovered security resources, a security level of the application is derived and outputted. In dependence on the derived and outputted security level, the execution of the application is controlled in a range of functions corresponding to the security level, by the application either being immediately executed or at least put in an executable state (activated) to be executed later.

For example, at a low discovered security level the application is not executed at all and remains deactivated, since the security risk due to an application execution on the mobile station is seen to be too great. This prevents deficient security resources of a mobile station from damaging the image of a basically trustworthy application.

According to a further example, at a medium discovered security level the application is executed in a restricted range of functions (or activated in such a range of functions). In particular, especially security-critical functionalities of the application can remain deactivated, and only functionalities of the application that are security-critical to a low or at most medium degree are activated, and therefore executable.

According to a further example, at a high discovered security level the application is executed or activated, i.e. made executable, in the full range of functions. In particular, especially security-critical functionalities of the application are also activated and therefore executable.

A programming interface having a discovery module with which application security levels are derivable and outputable can be adapted in particular for offering the following functionalities, which are stated hereinafter in a conceivable pseudo-command language with a subsequent description of the functionality:

getSecDevices( ): discover all security resources available in the mobile station and derive and output the application security level of every discovered security resource;

validateSecService( ): supply functionality information about which application functionalities are available at which application security level or in which application variant; or alternatively or additionally: discover which application security level must be chosen for a desired application functionality to be available;

getHighestSecLevel( ): derive and output the highest security level available in the mobile station;

selectSecLevel( ): specify an application security level for an application to be implemented and/or to be executed, and thereby implicitly specify a security resource corresponding to the application security level, in which resource the application is implemented or executed;

getSelectedSecLevel( ): discover the currently set application security level, which was set as a rule by a preceding selectSecLevel( );

HighestSecLevel( ): specify the highest available application security level for an application to be implemented and/or to be executed, and thereby implicitly specify the security resource corresponding to the highest application security level, in which resource the application is implemented or executed.

An application loading system according to the invention comprises an application server and a mobile station as stated above. The application server is characterized by an application selection module coupled or coupleable with the discovery module, through which, in dependence on the application security level derived for an application, an application variant with a range of functions corresponding to the security level is selectable and suppliable for downloading to the mobile station.

Similarly to how a range of functions, corresponding to the security level, of an already implemented application was activated hereinabove, there is supplied here for downloading to the mobile station an application variant of the application that is coordinated with the security resources of the mobile station. At a high derived and outputted security level, for example, an application variant with a high range of functions is supplied. At a low derived and outputted security level, for example, an application variant with a low range of functions is supplied. The range of functions is electively specified by the presence or absence of functional components of the application in the respective functional variant. Electively, the range of functions is specified by functional components being activated or deactivated, in accordance with the desired range of functions.

Electively, the suppliable application variant comprises: the application with the range of functions corresponding to the security level, and/or additional functionalities (additional services) intended to supplement the application.

In a method for downloading an application variant to a mobile station, the application selection module of the application server is coupled with the discovery module of the mobile station. In particular, the mobile station and the application server are thus coupled with each other, electively via a contact-type connection or alternatively via a contactless radio connection, in particular mobile radio connection or other radio connection. With the discovery module an application security level is discovered and outputted. This can electively be effected while the mobile station is connected to the application server, or at an earlier time point. The discovered and outputted application security level is transmitted to the application selection module. In dependence on the application security level, an application variant corresponding to the application security level and having a range of functions corresponding to the application security level is selected by the application selection module and supplied on the application server for downloading to the mobile station. Finally, the supplied application variant is downloaded from the application server to the mobile station.

A risk assessment system according to the invention comprises one or a plurality of mobile stations and a risk server. In at least one mobile station there is contained (implemented) at least one application. The application server is characterized by a risk assessment module coupled or coupleable with the discovery module, through which, in dependence on the application security level of the application or applications contained in the mobile station or mobile stations, a risk emanating from the mobile station or plurality of mobile stations is derivable. Electively, the risk incorporates further parameters, e.g. number of mobile stations in circulation, number or proportion (e.g. percentage) of the mobile stations in circulation in which applications with too low a security level are implemented, and the like.

BRIEF DESCRIPTION OF THE DRAWINGS

Hereinafter the invention will be explained more closely on the basis of exemplary embodiments and with reference to the drawing, in which are shown.

DETAILED DESCRIPTION OF VARIOUS EMBODIMENTS

Figure 1:
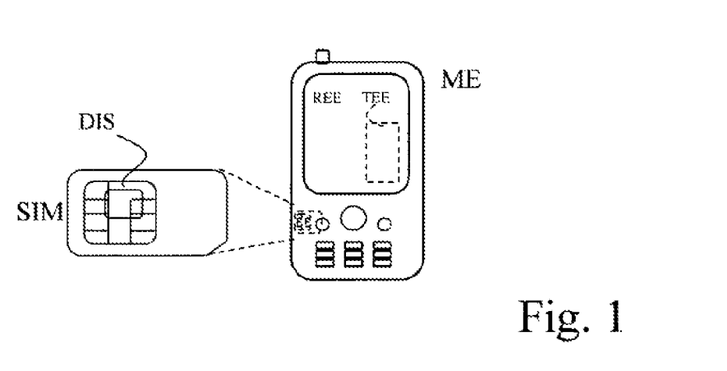
FIG. 1 a mobile station having security resources and a discovery module, according to one embodiment of the invention.

FIG. 1 shows a mobile station. The mobile station comprises an end device ME. The mobile station further comprises as security resources SR three security modules, namely, firstly a normal runtime environment REE (Rich Execution Environment), secondly a secure runtime environment TEE (Trusted Execution Environment), and thirdly a SIM card SIM. Further, the mobile station comprises a discovery module DIS, according to one embodiment of the invention. Of the three security modules constituting the security resources SR of the mobile station, the SIM card has the highest security level, the secure runtime environment the second highest, and the normal runtime environment the lowest security level. The discovery module DIS is arranged (implemented) in the SIM card SIM of the mobile station, which has the highest security level of the security resources.

Figure 2:
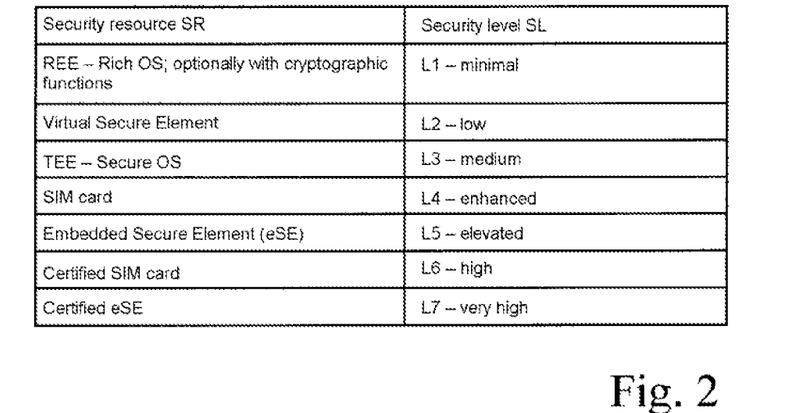
FIG. 2 an assignment table between security resources and security levels, according to one embodiment of the invention.

FIG. 2 shows an assignment table between security resources SR and security level SL of a mobile station, according to one embodiment of the invention. The security level SL and therefore the security and trustworthiness of the mobile station increases from the top down in the table. A normal runtime environment REE controlled by a normal operating system Rich OS has the lowest security level L1—minimal—in the assignment table. A virtual Secure Element SE implemented in an end device ME has a somewhat higher, low security level L2. A secure runtime environment implemented in the end device ME and controlled by a security operating system Secure OS has a medium security level L3. A SIM card has an enhanced security level L4. A hard-implemented embedded Secure Element eSE (e.g. eUICC) has an elevated security level L5. A certified SIM card has a high security level L6, and a certified embedded Secure Element eSE has a very high security level L7.

Figure 3:
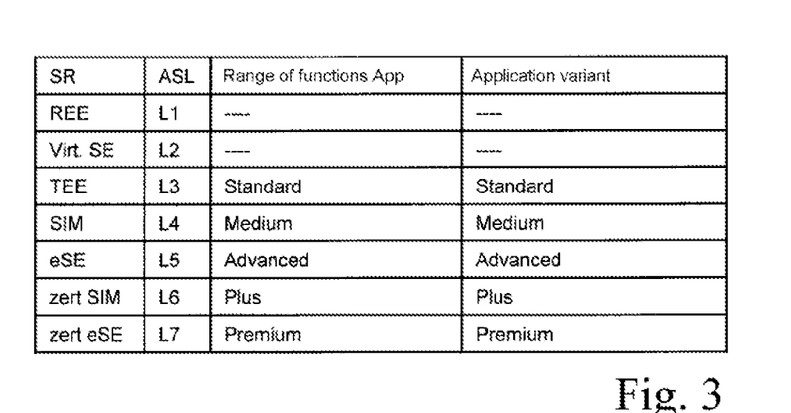
FIG. 3 an assignment table between security resources, application security levels, ranges of functions and application variants, according to one embodiment of the invention.

FIG. 3 shows an assignment table between security resources SR, application security levels ASL relating to an application APP provided for a mobile station, ranges of functions of the application and application variants of the application, according to one embodiment of the invention. As in the assignment table from FIG. 2, the application security level increases from the top down in the assignment table from FIG. 3. Likewise, the range of functions of the application increases from the top down. In particular, security-critical functionalities are added to the range of functions increasingly from the top down.

The application APP is intended to be implemented in a mobile station. The application APP has the possibility of guaranteeing a defined security level, provided the security resources SR of the mobile station are sufficiently secure. In dependence on the security resource (security module, component) (e.g. end device REE or TEE or SIM card) of the mobile station in which the application APP is to be implemented, different application variants are supplied.

The two lowest application security levels L1, L2 and thus the security resources/security modules, normal runtime environment REE and virtual SE, are classified as so insufficiently secure that the application is not conceded any range of functions. Consequently, no application variant of the application is available for a normal runtime environment and a virtual Secure Element.

For a secure runtime environment TEE, controlled by a security operating system Secure OS, the application guarantees a medium application security level L3, provided the application is operated only at most in the standard range of functions. Consequently, for implementation in a secure runtime environment TEE of a mobile station there is supplied the application variant Standard, which covers the range of functions Standard of the application APP.

A SIM card yields to the application APP an enhanced application security level L4. Consequently, there can be contained in the range of functions of the application APP for the SIM card, in addition to the range of functions for a secure runtime environment TEE, some rather security-critical functionalities, in accordance with the range of functions Medium, which is greater than the range of functions Standard. For the SIM card the application variant Medium is therefore supplied.

For an embedded Secure Element eSE in which the application APP, when it is implemented therein, guarantees an application security level L5, the application variant Advanced with an elevated range of functions Advanced is supplied.

For a certified SIM card the application variant Plus is supplied.

For a certified embedded Secure Element eSE, finally, the application variant Premium with the highest available range of functions Premium is supplied.

Premium is electively the full range of functions, with the ranges of functions Standard, Medium, Advanced and Plus being ranges of functions varying in degree of restriction.

Alternatively, another range of functions, for example Medium, is the "full" range of functions. In this alternative, Standard is a restricted range of functions and Advanced, Plus and Premium are ranges of functions that are extended by additional services or additional functionalities.

Figure 4:
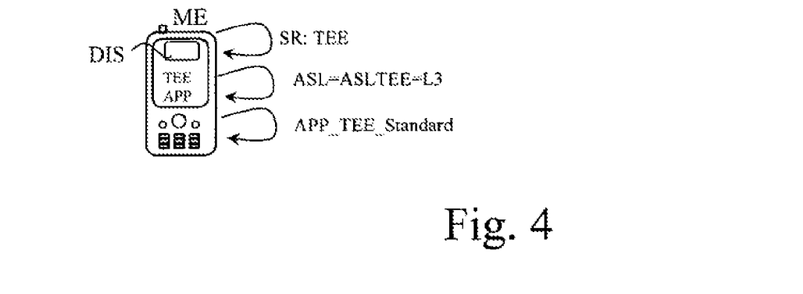
FIG. 4 an activating of an already implemented application, according to one embodiment of the invention.

FIG. 4 shows an activating of an application APP already implemented in a mobile station, which is to run in a secure runtime environment TEE, according to one embodiment of the invention. The mobile station comprises an end device ME which is assumed to have a secure runtime environment TEE. In the mobile station, preferably in a SIM card or an embedded Secure Element eSE of the mobile station (not represented), a discovery module DIS is implemented. The discovery module DIS discovers that the security resource SR, secure runtime environment TEE, is actually present, e.g. has not meanwhile been uninstalled. Accordingly, there is assigned to the mobile station in relation to the application APP the application security level L3 according to FIG. 3. The application APP is therefore activated with a range of functions Standard.

Figure 5:
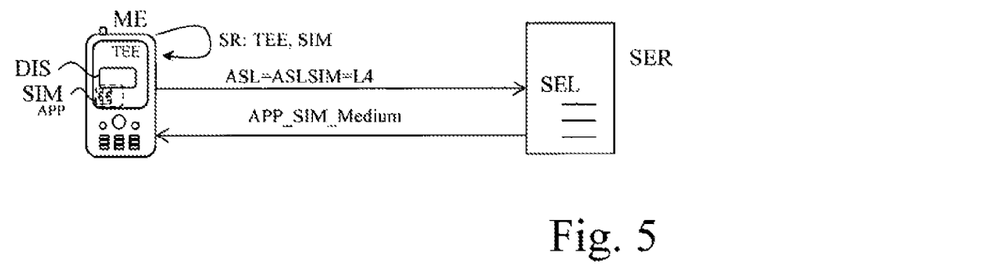
FIG. 5 a selecting and downloading of an application to be implemented, according to one embodiment of the invention.

FIG. 5 shows a selecting and downloading of an application APP to be implemented, according to one embodiment of the invention. The application APP is ready on an application server SER and is to be loaded into the SIM card SIM of a mobile station comprising a mobile end device ME and the SIM card. In the SIM card a discovery module DIS is implemented. With the discovery module DIS it is discovered that the mobile station has the SIM card and the secure runtime environment TEE of the end device ME as security resources SR. In particular, it is discovered that the SIM card is actually present. The application APP is assigned the application security level L4 according to the assignment table from FIG. 3 by means of the discovery module DIS of the mobile station in relation to the SIM card. The application security level L4 is transmitted from the mobile station to the application server SER. In the application server SER the transmitted application security level L4 is accepted by the application selection module SEL, which selects for the SIM card the application variant Medium corresponding to the application security level L4, and transmits it to the mobile station, for implementation in the SIM card. Finally, the application APP is implemented in the SIM card in the application variant Medium.

Figure 6:
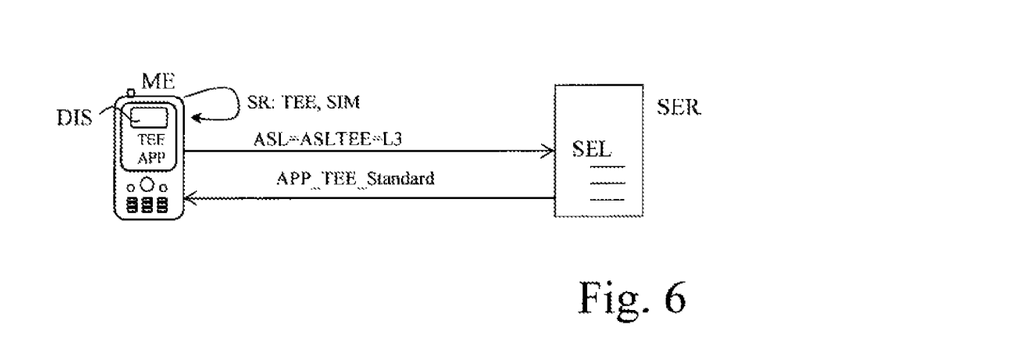
FIG. 6 a selecting and downloading of an application to be implemented, according to a further embodiment of the invention.

FIG. 6 shows a selecting and downloading, analogous to FIG. 5, of an application APP to be implemented, according to a further embodiment of the invention. Unlike FIG. 5, an application is downloaded in FIG. 6 for a secure runtime environment TEE. The discovery module DIS is implemented in the SIM card (security resource SR yielding the highest security level). As security resources SR, the SIM card and the secure runtime environment TEE are discovered. Since the application is to be loaded into the secure runtime environment TEE, the relevant application security level ASL is now that of the secure runtime environment TEE, i.e. L3. L3 is discovered by the discovery module DIS as the relevant application security level ASL and supplied to the application server SER. The application selection module SEL selects the application variant Standard corresponding to the application security level L3 and transmits it to the mobile station, for implementation in the secure runtime environment TEE. Finally, the application APP is implemented in the secure runtime environment TEE in the application variant Standard.

In the embodiments of FIGS. 5, 6, the discovery module DIS is implemented in the SIM card, since the latter yields the highest security level. Alternatively, it can be provided that the discovery module DIS is always implemented in a security resource hard-implemented in the end device ME in order to prevent the discovery module DIS from being removed from the mobile station.

The invention claimed is:

1. A mobile station that guarantees a defined application security level for one or more applications implemented or to be implemented in the mobile station, the mobile station comprising:

a mobile end device; and
a discovery module,
wherein the mobile station includes one or more security resources, each of the one or more security resources having a corresponding security level,
wherein the discovery module is configured to
discover the one or more security resources of the mobile station,
derive at least one security level of the mobile station that is achieved by the one or more security resources, and
output to an application server the at least one derived security level of the mobile station, the application server being configured to load the one or more applications to the mobile end device, and
wherein
the mobile station further contains application information about at least one application implemented or implementable in the mobile station, and
with the discovery module there is derivable, as the at least one security level, an application security level that is achievable while employing the one or more security resources upon an operation of the at least one application in the mobile station, and
wherein
the discovery module is integrated into a programming interface by which output information concerning the at least one security level of the mobile station is outputable from the mobile station or control information for controlling the at least one security level is inputtable to the mobile station,
the discovery module is implemented in a subscriber identity module that is coupleable and removable from the mobile end device, or
the discovery module is implemented in a security resource of the mobile station that is hard-implemented in the end device.

2. The mobile station according to claim 1, wherein there are provided as the one or more security resources one or more of the following security modules:

a normal runtime environment of the end device, the normal runtime environment being with or without cryptographic functions;
a virtual subscriber identity module implemented in the end device;
a secure runtime environment of the end device;
a subscriber identity module being a removable subscriber identity module, a hard-implemented subscriber identity module, a certified removable subscriber identity module, or a certified hard-implemented subscriber identity module; and
a secure microprocessor memory card, a Secure Digital (SD) card, or a Secure MicroSD card.

3. The mobile station according to claim 2, wherein for each of said one or more of security modules or for any combination of said one or more of security modules of the mobile station, a corresponding security level is derivable and outputable.

4. The mobile station according to claim 1, wherein the discovery module is integrated into a programming interface by means of which output information concerning the at least one security level of the mobile station is outputable from the mobile station or control information for controlling the at least one security level is inputtable to the mobile station.

5. The mobile station according to claim 1, wherein there is outputable as the output information one or more of the following:
the at least one security level of the mobile station;
an available security resource of the mobile station;
a security level of a security resource;
all security levels of all security resources of the mobile station;
all available security resources of the mobile station;
a highest available security level of the mobile station;
a currently set security level of the mobile station; and
functionality information on functionalities available for every security level or for every security resource.

6. The mobile station according to claim 1, wherein the control information involves one or more of the following:
specifying a utilization of a certain security resource with a certain security level; and
specifying a utilization of a security resource that has a highest security level.

7. The mobile station according to claim 1, wherein the discovery module is implemented in a security resource of the mobile station that yields to the mobile station a highest security level.

8. The mobile station according to claim 1, wherein the discovery module is implemented in a security resource of the mobile station that is hard-implemented in the end device.

9. The mobile station according to claim 1, wherein an application control module coupled or coupleable with the discovery module, through which, in dependence on the application security level derived for the at least one application, an execution of the at least one application is controllable in a range of functions corresponding to the application security level.

10. The mobile station according to claim 9, wherein there is provided as the execution of the at least one application that is controllable in the range of functions corresponding to the application security level one of the following:
execution of the at least one application in an extended range of functions;
execution of the at least one application in a full range of functions;
execution of the at least one application in a restricted range of functions; or
non-execution of the at least one application.

11. The mobile station according to claim 1, wherein the mobile station includes a plurality of security resources that includes a first security resource and a second security resource, the first security resource having a corresponding first security level and the second security resource having a corresponding second security level, wherein the first security level is a higher security level than the second security level.

12. An application loading system that guarantees a defined application security level for one or more applications implemented or to be implemented in a mobile station, the application loading system comprising:

the mobile station; and
an application server configured to load the one or more applications to a mobile end device, wherein
the mobile station includes the mobile end device and a discovery module,
wherein the mobile station includes one or more security resources, each of the one or more security resources having a corresponding security level,
wherein the discovery module is configured to
discover said one or more security resources of the mobile station,
derive at least one security level of the mobile station that is achieved by the one or more security resources, and
output to the application server the at least one derived security level of the mobile station, and
the application server includes an application selection module coupled or coupleable with the discovery module, through which, in dependence on an application security level derived for an application, an application variant with a range of functions corresponding to the application security level is selectable and suppliable for downloading to the mobile station, and
wherein
the mobile station further contains application information about at least one application implemented or implementable in the mobile station, and
with the discovery module there is derivable, as the at least one security level, an application security level that is achievable while employing the one or more security resources upon an operation of the at least one application in the mobile station, and
wherein
the discovery module is integrated into a programming interface by which output information concerning the at least one security level of the mobile station is outputable from the mobile station or control information for controlling the at least one security level is inputtable to the mobile station,
the discovery module is provided in a subscriber identity module that is coupleable and removable from the mobile end device, or
the discovery module is implemented in a security resource of the mobile station that is hard-implemented in the end device.

13. The application loading system according to claim 12, wherein the suppliable application variant comprises: the application with the range of functions corresponding to the application security level, or functionalities intended to supplement the application with additional functionalities.

14. A risk assessment system that guarantees a defined application security level for one or more applications implemented or to be implemented in a mobile station, the risk assessment system comprising:
at least the mobile station; and
a risk server,
wherein the mobile station includes a mobile end device and a discovery module,
wherein the mobile station includes one or more security resources, each of the one or more security resources having a corresponding security level,
wherein the discovery module being configured to
discover said one or more security resources of the mobile station,
derive at least one security level of the mobile station that is achieved by the one or more security resources, and output to an application server the at least one derived security level of the mobile station, the application server being configured to load the one or more applications to the mobile end device, and wherein in the mobile station there is contained at least one application, wherein the risk server includes a risk assessment module coupled or coupleable with the discovery module, through which, in dependence on the application security level of the at least one application contained in the mobile station, a risk emanating from the mobile station is derivable, and wherein the mobile station further contains application information about at least one application implemented or implementable in the mobile station, and with the discovery module there is derivable, as the at least one security level, an application security level that is achievable while employing the one or more security resources upon an operation of the at least one application in the mobile station, and wherein the discovery module is integrated into a programming interface by which output information concerning the at least one security level of the mobile station is outputable from the mobile station or control information for controlling the at least one security level is inputtable to the mobile station, the discovery module is provided in a subscriber identity module that is coupleable and removable from the mobile end device, or the discovery module is implemented in a security resource of the mobile station that is hard-implemented in the end device.

* * * * *